United States Patent [19]
Kikuchi et al.

[11] Patent Number: 6,112,894
[45] Date of Patent: Sep. 5, 2000

[54] DISC MEDIUM ACCOMMODATING CASE

[75] Inventors: Shuichi Kikuchi; Daiki Kobayashi, both of Miyagi, Japan

[73] Assignee: Sony Corporation, Tokyo, Japan

[21] Appl. No.: 09/329,742

[22] Filed: Jun. 10, 1999

[30] Foreign Application Priority Data

Jun. 12, 1998 [JP] Japan ................................. 10-164937

[51] Int. Cl.[7] .................................................. B65D 85/57
[52] U.S. Cl. ...................... 206/308.1; 206/303; 206/309; 206/493
[58] Field of Search ................................ 206/303, 308.1, 206/307, 309–312, 493; 211/59.1, 50, 40, 57.1

[56] References Cited

U.S. PATENT DOCUMENTS

| | | | |
|---|---|---|---|
| 4,253,571 | 3/1981 | Keohan | 206/303 |
| 4,316,281 | 2/1982 | Prusak | 206/309 |
| 4,502,598 | 3/1985 | Wartenbergh | 206/309 |
| 4,516,678 | 5/1985 | Fotiadis et al. | 206/309 |
| 4,700,839 | 10/1987 | Fujii | 206/309 |
| 4,848,571 | 7/1989 | Fullar | 206/303 |
| 5,363,962 | 11/1994 | Toral et al. | 206/303 |
| 5,669,494 | 9/1997 | Geffen | 206/308.1 |

*Primary Examiner*—Paul T. Sewell
*Assistant Examiner*—Luan K. Bui
*Attorney, Agent, or Firm*—Frommer Lawrence & Haug, LLP.; William S. Frommer; Matthew K. Ryan

[57] ABSTRACT

Disclosed is disc medium accommodating case for conveying a large number of disc media, in which the embedding structure for the column for stacking the disc media and the case bottom plate member is improved, whereby a sturdy case is provided which is free from deformation or breakage during handling, transportation, etc. A disc medium accommodating case includes a disc-like case bottom plate member having a diameter that is larger than the outer diameter of the disc media, a stacking column which is embedded substantially at the center of the case bottom plate member in an erect position, a protective cover member formed as a truncated cone and adapted to be placed on the case bottom plate member, and a cap for fastening the protective cover member to the case bottom plate member through the intermediation of the stacking column, wherein a column insertion hole into which the stacking column can be inserted is provided at the center of the case bottom plate member, and wherein a flange portion is provided at the base end of the stacking column. The stacking column is inserted into the column insertion hole from the back side of the case bottom plate member to join the flange portion with the back side of the case bottom plate member by ultrasonic welding.

6 Claims, 10 Drawing Sheets

DISC MEDIUM ACCOMMODATING CASE

BACKGROUND OF THE INVENTION

1. Field of the Invention

The present invention relates to a disc medium accommodating case and, in particular, to a disc medium accommodating case for accommodating and transferring a large number of disc media, for example, a plurality of optical discs such as CD-R (compact disc recordable) and DVD (digital video disc).

2. Description of the Related Art

The conventional music CDs (CD-ROM; compact disc read only memory) sold at record shops, etc. are media for reading only; information is recorded in the pressing process, so that writing of new information is impossible.

The disc media that are on sale under the abbreviated designation of "CD-R" are so-called "write-once" type media, which allow information to be written thereto only once. CD-R are shipped in a blank condition like blank tapes and discs, so that the user can record various kinds of information thereon, making it possible to easily and economically produce CDs.

As shown in FIG. 17, a CD-R 10 usually comprises four layers superimposed one upon the other in the following order: a transparent synthetic resin substrate 12 formed of polycarbonate or the like and having 1.6 μm pitch guide grooves 11; a pigment recording layer 13; a metal reflection layer 14; and a UV resin top coating layer 15.

To perform recording on this CD-R 10, constructed as described above, information is written thereto by applying laser pulses condensed on the guide grooves 11 formed on the disc substrate. The bits, the units for recording, are formed by generating deformed portions (recording pits) in the order of sub-micron on the disc substrate through mutual action between the pigment heated and melted by the laser application to partially decompose and the substrate material softened by heating. Thus, a recording medium having a very stable structure is obtained.

Regarding the equipment for performing recording on the CD-R 10, having the above features, no conventional equipment for performing recording on CDs, such as equipment for complicated data processing or equipment for large-scale cutting or stamping, is required. That is, to perform recording on the CD-R 10, the above-described processing for recording on CD is not necessary, and data can be written easily by a CD recording unit, whereby the production is executed in a relatively small equipment. On the UV resin top coating layer 15 of the CD-R 10 on which data has been written, printing is performed by silk printing or the like to protect the recorded information, etc.

In this way, when producing the CD-R 10, unrecorded disc media are prepared in relatively large-scale, well-managed plant, and then a plurality of them are accommodated in a disc medium accommodating case called bulk pack before they are transferred to a relatively small-scale production company for writing information, where the recording of information, the printing of labels, etc. are performed; the disc media are then accommodated in CD carrying cases or the like and sold or distributed.

As shown in FIG. 18, a disc medium accommodating case 20 for accommodating a large number of disc media, such as CD-R, for conveyance is generally formed as a truncated cone and comprises a case bottom plate member 21 having a diameter larger than the outer diameter of a CD-R (hereinafter referred to as the disc medium), a stacking column 22 arranged in an erect position at the center of this case bottom plate member 21, a protective cover member 23 formed as a truncated cone and adapted to be placed on the case bottom plate member 21, and a cap 24 for securing this protective cover member 23 in position through the intermediation of the stacking column 22.

As shown in FIG. 19, at the center of the case bottom plate member 21, there is provided a female screw portion 25 for keeping the stacking column 22 erect.

As shown in FIG. 18, the stacking column 22 includes a column portion 27 having a diameter smaller than the inner diameter of the chucking hole 26 of the disc medium 10 and having at its forward end a male screw to form a male threaded-engagement portion 28. At the base end thereof, there is provided a male screw portion 29 (See FIG. 19) adapted to be threadedly engaged with a female screw portion 25 of the case bottom plate member 21.

The protective cover member 23, which is formed as a truncated cone, includes a top surface 30 whose diameter is larger than the outer diameter of the disc medium 10. The bottom portion of the protective cover, which is connected to the top surface 30 through the intermediation of a peripheral side wall 31, has a diameter that fits to the outer diameter of the case bottom plate member 21. At the center of the top surface 30, there is provided a through-hole 32 which engages with some play with the male threaded-engagement portion 28 of the stacking column 22.

The cap 24 is formed as a cylinder; at the center of the bottom portion thereof, there is provided a female threaded-engagement portion 33 consisting of a female screw adapted to threadedly engage with the male threaded-engagement portion 28 of the stacking column 22.

In the disc medium accommodating case 20, constructed as described above, a plurality of disc media 10 are first fitted onto the column portion 27 of the stacking column 22 by inserting column portion through the chucking holes 26 of the disc media 10. After a desired number of disc media 10 have been mounted, the protective cover 23 is placed thereon from above. At this time, the through-hole 32 is engaged with the male threaded-engagement portion 28, and then the outer peripheral end portion at the bottom of the protective cover 23 is fitted onto the outer peripheral portion of the case bottom plate member 21. In this condition, the cap 24 is fitted from above onto the male threaded-engagement portion 28 of the stacking column 22, and turned to in the closing direction, whereby the case is completed. In this way, the disc media 10 is accommodated for transportation.

However, in the above construction, to engage the stacking column with the disc-like case plate member, the male screw portion of the stacking column is threadedly engaged with the female screw portion of the case bottom plate member. Due to this construction, there is a fear that the male and female screw portions will be deflected, broken, etc. due to the vibrations and impact when a large number of disc media are mounted and transported.

To solve this problem, an adhesive is poured into the treaded-engagement portion where the male screw portion of the stacking column is threadedly engaged with the female screw portion of the case bottom plate member to thereby achieve reinforcement.

However, the reinforcement with an adhesive or the like has a problem in that trace amounts of the out gas generated when the adhesive cures has an adverse effect on the accommodated disc media (CD-R). Thus, the curing is conducted for a long period of time before accommodating the disc media, which means it is necessary to secure the space for placing the case. Further, the case cannot be used until the curing is complete, so that the process time cannot be reduced.

SUMMARY OF THE INVENTION

Thus, it is an object of this invention to provide a disc medium accommodating case for transporting disc media which has a simple construction and which can withstand transportation.

To achieve the above object, there is provided, in accordance with the present invention, a disc medium accommodating case comprising a disc-like case bottom plate member having a diameter that is larger than the outer diameter of the disc media, a stacking column which is embedded substantially at the center of the case bottom plate member in an erect position and which has a diameter that is smaller than the inner diameter of the chucking holes of the disc media, a protective cover member formed as a truncated cone and adapted to be placed on the case bottom plate member, and a cap for fastening the protective cover member to the case bottom plate member through the intermediation of the stacking column, wherein a column insertion hole into which the stacking column can be inserted is provided at the center of the case bottom plate member, wherein a flange portion is provided at the base end of the stacking column and an engagement portion to be engaged with the cap is provided at the forward end thereof, and wherein the stacking column is inserted into the column insertion hole from the back side of the case bottom plate member to join the flange portion with the back side of the case bottom plate member.

The joining of the flange portion is effected by ultrasonic welding; the column insertion hole and the flange portion of the stacking column have a detent structure, or the flange portion has a non-circular configuration; the stacking column has planes cut out on either side with respect to the longitudinal direction, and protrusions generated by the seam between the dies are formed on the planes; and the case bottom plate member, the stacking column, the protective cover member and the cap are entirely or partially made antistatic.

In this way, the stacking column is inserted from the back side of the case bottom plate member, and the flange portion having a diameter larger than that of the column insertion hole is joined to the back side of the case bottom plate member. Due to this construction, when the protective cover portion is threadedly engaged by the cap through the intermediation of the stacking column, the flange portion and the back side of the case bottom plate member abut each other, whereby the joint between the case bottom plate member and the stacking column is reinforced.

Further, since the joining of the flange portion with the case bottom plate member is effected by ultrasonic welding, the joining can be effected in a short time. Further, since there is no need to use an adhesive, there is no generation of out gas, whereby an adverse effect on the disc media can be prevented.

Further, since a detent structure is adopted in the engagement between the flange portion and the case bottom plate member, the torsional force generated when the cap is fitted onto the stacking column is not applied to the joint portion between the flange portion and the case bottom plate member, whereby it is possible to prevent the joint portion from being separated, Further, the stacking column has planes cut out on either side with respect to the longitudinal direction, and protrusions generated by the seam between the dies are formed on the planes, whereby it is easy to secure the straightness of the stacking column, and it is possible to eliminate the extraction taper needed for injection molding, so that the dies can be easily prepared, thereby achieving a reduction in cost.

Further, by making the disc medium accommodating case antistatic, it is possible to prevent dust from adhering to the disc media due to static electricity generated when a large number of disc media undergo transportation, etc.

BRIEF DESCRIPTION OF THE DRAWINGS

FIGS. 1(A) and 1(B) show the components of a disc medium accommodating case according to an embodiment of the present invention, of which FIG. 1(A) is general exploded perspective view and FIG. 1(B) is a sectional view of the case bottom plate member;

FIGS. 4(A) and 4(B) illustrate how the flange portion of the stacking column constituting the disc medium accommodating case of the second embodiment of the present invention is subjected to ultrasonic welding, of which FIG. 4(A) is a perspective view, and FIG. 4(B) is a sectional view;

FIG. 9(A) is a general perspective view of the stacking column, and FIG. 9(B) is a sectional view of the column portion;

DESCRIPTION OF THE PREFERRED EMBODIMENTS

Next, embodiments of the disc medium accommodating case of the present invention will be described with reference to the drawings.

Figure 1A:
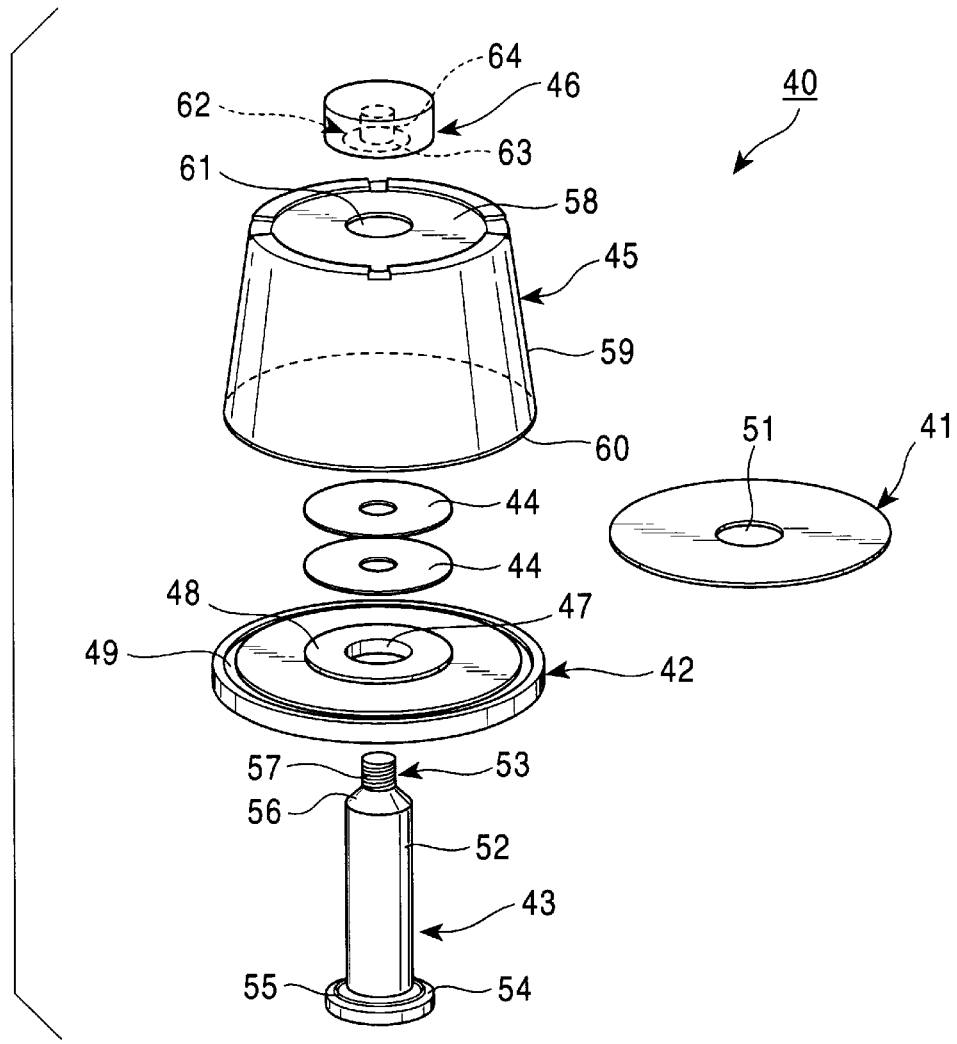
Figure 1B:
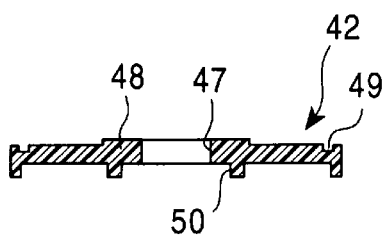
Figure 2:
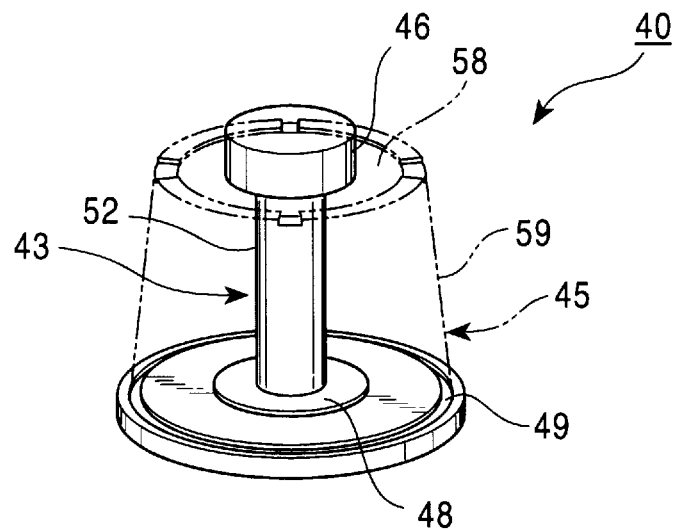
FIG. 2 is a perspective view showing the disc medium accommodating case obtained by assembling the components shown in FIG. 1.
Figure 3:
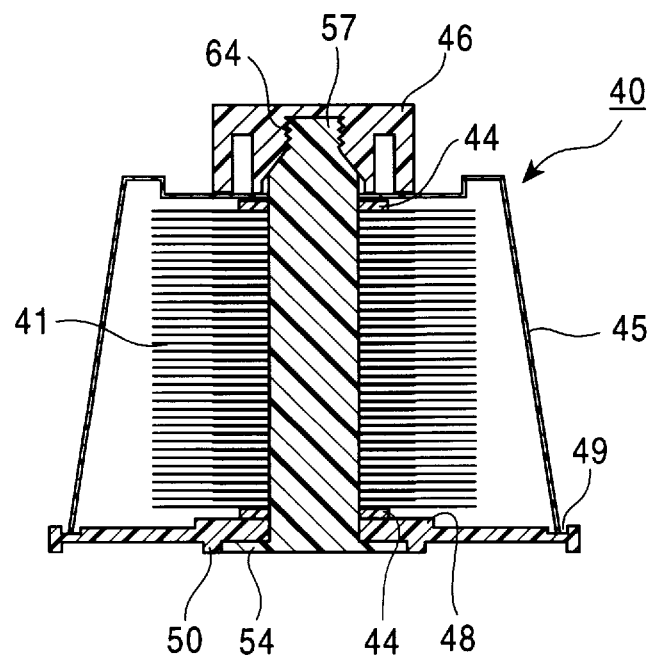
FIG. 3 is an enlarged sectional view of the assembled disc medium accommodating case of FIG. 2.

As shown in FIGS. 1 through 3, a disc medium accommodating case 40 according to the first embodiment of the present invention is generally formed as a truncated cone and comprises a disc-like case bottom plate member 42 having a diameter larger than the outer diameter of the disc medium 41, a columnar stacking column 43 inserted from the back side of the case bottom plate member 42 and embedded therein in an upright position, spacers 44 engaged with the columnar portion of the stacking column 43 and adapted to prevent generation of friction between the case bottom plate member 42 and the disc medium 41, a protective cover member 45 to be fastened to the case bottom plate member 42 through the intermediation of the stacking column 43 and formed as a truncated cone, and a cap 46 to be threadedly engaged with the stacking column with the protective cover member 45 being placed therebetween.

The case bottom plate member 42 comprises a column insertion hole 47 formed at the center thereof and having a size large enough to allow the stacking column 43 to be inserted therethrough, a seat formed so as to face this column insertion hole 47 and having a predetermined thickness, a cover end accommodating groove 49 consisting of a continuous groove provided in the outer peripheral portion of the disc-like configuration, and a flange receiving portion 50 formed at the center on the back side around the column insertion hole 47 and having a size large enough to accommodate the flange portion 54 of the stacking column 43 described below.

The stacking column 43 comprises a columnar portion 52 having a diameter smaller than the inner diameter of the chucking hole 51 of the disc medium 41, a male threaded-engagement portion provided at the forward end of this columnar portion 52, a flange portion 54 formed at the base end of the columnar portion 52 and having a diameter larger than the diameter of the column insertion hole 47 of the case bottom plate member 42, and a welding rib 55 formed on the inner side of the flange portion 54 along the outer peripheral edge of the columnar portion 52.

The male threaded-engagement portion 53 comprises a cap receiving portion 56 formed by tapering the forward end portion of the columnar portion 52, and a male screw 57 connected to this cap receiving portion 56.

The protective cover 45 is formed as a truncated cone, and the outer diameter of the top surface 58 thereof is larger than the outer diameter of the disc medium 41. Further, the diameter of the bottom portion 60 connected thereto through an annular side wall 59 is large enough to be accommodated in the cover end accommodating groove 49 of the case bottom plate member 42. At the center of the top surface 58, there is provided a through-hole 61 having a size large enough to be engaged with some play with the male threaded-engagement portion 53 of the stacking column 43.

The cap 46 is formed in a cylindrical configuration and the outer diameter thereof is larger than the diameter of the chucking hole 51 of the disc medium 41 and smaller than the diameter of the inner peripheral recording area of the disc medium 41. At the center of its bottom portion, there is provided a female threaded-engagement portion 62 which is an engagement portion to be threadedly engaged with the male threaded-engagement portion 53 of the stacking column 43.

The female threaded-engagement portion 62 comprises a column receiving portion 63 consisting of a tapered recess in conformity with the configuration of the cap receiving portion 56 of the male threaded-engagement portion 53, and a female screw 64 connected to this column receiving portion 63 and adapted to be engaged with the male screw 57.

The disc medium accommodating case 40, constructed as described above, is assembled as follows: first, the head portion of the stacking column 43, that is, the male threaded-engagement portion 53, is inserted from the back side into the column insertion hole 47 formed at the center of the case bottom plate member 42, and the flange portion 54 is brought into close contact with the flange receiving portion 50. Then, an ultrasonic horn (not shown) is pressed against the welding rib 55 provided in the inner periphery of the flange portion 54 and ultrasonic oscillation is applied thereto, whereby the welding rib 55 is melted and, as shown in FIG. 3, the stacking column 43 is embedded in an upright position in the case bottom plate member 42.

While in this example, the joining between the flange portion 54 and the flange receiving portion 50 is conducted by using ultrasonic waves, it is also possible to effect the joining by using an adhesive. In this case, the adhesive is applied to the inner side of the flange portion 54, which is glued to the flange receiving portion 50. In this case, the welding rib 55 is not needed.

The disc media 41 are accommodated in the disc medium accommodating case 40, constructed as described above, as follows: first, the spacers 44 are inserted and mounted, and the chucking holes 51 of a plurality of disc media (or a large number of disc media) 41 are matched with the stacking column 43, the disc media being fitted onto the stacking column. After a desired number of disc media 41 have been mounted, the protective cover 45 is placed from above. At this time, when the through-hole 61 is engaged with the male threaded-engagement portion 53, the outer peripheral portion of the bottom portion 60 of the protective cover 45 is fitted into the cover end accommodating groove 49. In this condition, the female threaded-engagement portion 62 of the cap 46 is match from above with the male threaded-engagement portion 53 of the stacking column 43, and fastened by turning. In this way, the disc media 41 are accommodated and transported. When extracting the disc media 41 from the disc medium accommodating case 40, the cap 46 is turned to disengage it from the male threaded-engagement portion 53 of the stacking column 43, and the protective cover 45 is detached.

The case bottom plate member 42, the stacking column 43, and the cap 46 are formed of acryl-butylene-styrol (ABS) resin by injection molding. When the stacking column 43 is joined to the case bottom plate member 42 by ultrasonic welding, it is necessary for them to be formed of resins of the same nature (mutually compatible resins).

To prepare the protective cover member 45, a polyethylene (PET) sheet is formed into the annular side wall 59 and the top surface 58 connected thereto by vacuum molding, and the through-hole 61 is formed by stamping.

It is also possible to form a thermoplastic resin sheet of polypropylene (PP), vinyl chloride (PVC), polystyrene (PS) or the like by vacuum molding or the like or, as in the case of the bottom plate member 42, by injection molding.

Next, a disc medium accommodating case according to the second embodiment will be described with reference to FIG. 4. Since the construction of this embodiment is similar to that of the case of the first embodiment, the components which are the same as those of the first embodiment are indicated by the same reference numerals, and a description of such components will be omitted.

In the disc medium accommodating case 40 of the second embodiment, the joint between the case bottom plate member 42 and the stacking column 43 is formed of a material suitable for ultrasonic welding. That is, the case bottom plate member 42 and the stacking column 43 are formed by injection molding using similar, compatible thermoplastic resins, such as acryl-butylene-styrol (ABS), polystyrene (PS, GP-PS), high-impact-polystyrene (HI-PS), acryl-styrol (AS), polypropylene (PP), polycarbonate (PC), etc.

Figure 4A:
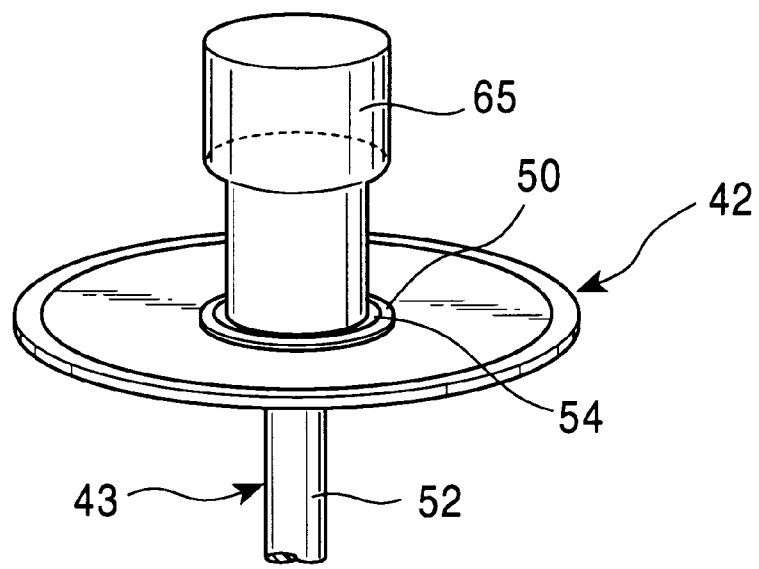
Figure 4B:
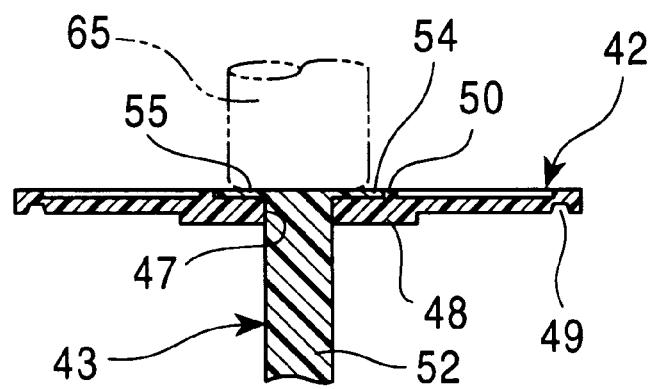

As shown in FIG. 4, the case bottom plate member 42 and the stacking column 43, formed by injection molding, are assembled by inserting the latter from the back side of the column insertion hole 47 of the case bottom plate member 42, and a flange portion 54 is brought into close contact with a flange receiving portion 50. In this condition, an ultrasonic horn 65 is pressed against the welding rib 55 formed on the flange portion 54, and oscillation is applied, whereby the welding rib 55 is melted and the case bottom plate member 42 is welded to the stacking column 43.

The ultrasonic horn 65 in this embodiment is held for 0.5 sec. to apply oscillation at a frequency of 20 KHz, an amplitude of 20 $\mu$mP-P, an output power of 900 W, and a pressurizing force of 400 kpa.

In this way, the case bottom plate member 42 and the flange portion 54 formed on the stacking column 43 can be joined together in a short time by ultrasonic welding, and reinforced welding is possible without using an adhesive. Thus, there is no need to use an adhesive, and there is no adverse effect of out gas generated as a result of using an adhesive.

Next, a disc medium accommodating case according to the third embodiment of the present invention will be described with reference to FIGS. 5 through 8.

In the disc medium accommodating case of the third embodiment, a detent structure is provided in the flange portion in the joining of the case bottom plate member and the flange portion of the stacking column. There are various modifications of this detent structure.

Figure 5:
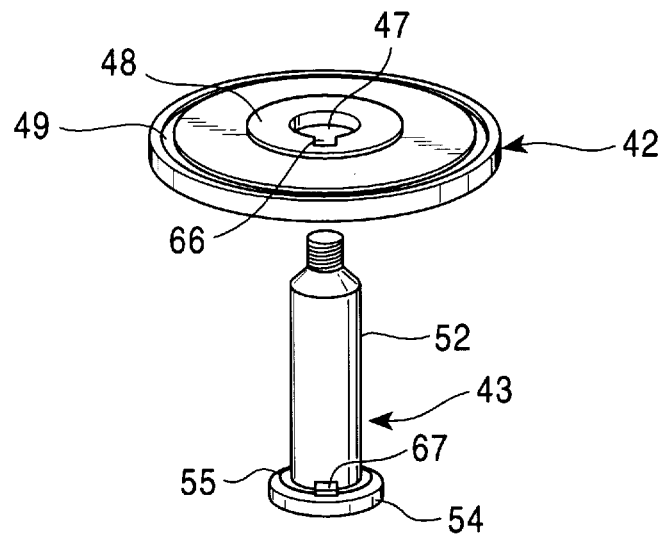
FIG. 5 is a perspective view of a first modification of a disc medium accommodating case according to the third embodiment of the present invention, in which recess and protrusion are provided in the flange portion and the column insertion hole as a detent structure in the flange portion.

As shown in FIG. 5, in the first modification, a cutout recess 66 is formed in a part of the inner peripheral surface of the column insertion hole 47 provided at the center of the case bottom plate member 42. Further, a protrusion 67 is formed in a part of the flange portion 54 of the stacking column 43. This protrusion 67 can be engaged with the recess 66 provided in the column insertion hole 47 of the case bottom plate member 42, and its height is smaller than that of the seat 48.

When joining the case bottom plate 42 and the stacking column 43, constructed as described above, the recess 66 is mated with the protrusion 67. By thus forming a detent structure consisting of a recess and a protrusion, no torsional force is applied to the joint portion between the case bottom plate member 42 and the stacking column 43 when the cap 46 (See FIG. 2) is threadedly engaged with the stacking column 43, whereby it is possible to prevent separation of the joint portion from being generated when attaching or detaching the cap 46.

Figure 6:
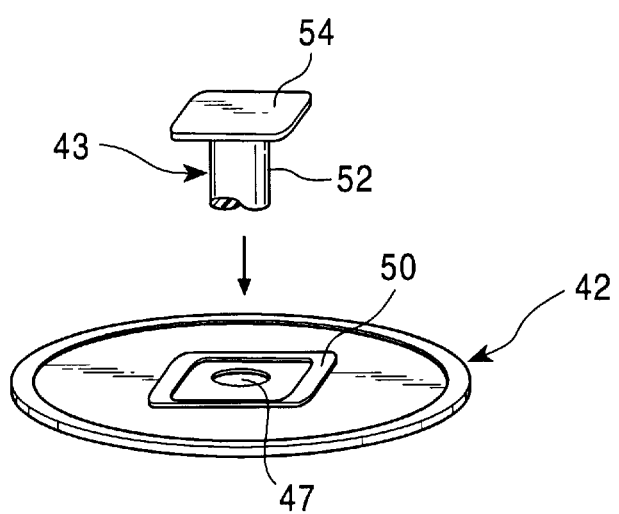
FIG. 6 is a perspective view of a second modification of the detent structure in the flange portion, in which the flange portion is formed as a non-circular, rectangular portion.

As shown in FIG. 6, in the second embodiment, a flange receiving portion 50 having a non-circular, rectangular configuration is formed at the center of the column insertion hole 47 on the back side of the case bottom plate member 42, and the flange portion 54 of the stacking column 43 has also a rectangular configuration and can be engaged with the flange receiving portion 50.

In the case of this case bottom plate member 42 and the flange portion 54 having a rectangular configuration, positioning can be effected at the time of joining and the torsional force after the joining can be coped with, so that it is possible to prevent separation of the joint portion from being generated when the cap 46 (See FIG. 2) is attached or detached.

Figure 7:
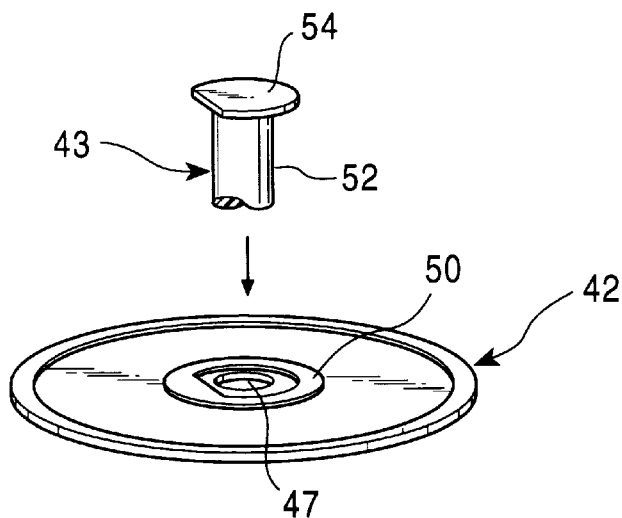
FIG. 7 is a perspective view of a third modification of the detent structure in the flange portion, in which the flange portion is formed as a non-circular, partially cut away portion.

As shown in FIG. 7, in the third modification, the flange receiving portion 50 provided at the center of the column insertion hole 47 on the back side of the case bottom plate member 42 has a non-circular configuration, which is formed by cutting away a part of circular member, and the flange portion 54 of the stacking column 43 has also a non-circular configuration formed by partially cutting out a circular portion.

In the case of the case bottom plate member 43 and the flange portion 54 having such a non-circular configuration formed by partially cutting away a circular portion, positioning can be effected at the time of joining and the torsional force after the joining can be coped with, so that it is possible to prevent separation of the joint portion from being generated when the cap 46 (See FIG. 2) is attached or detached.

Figure 8:
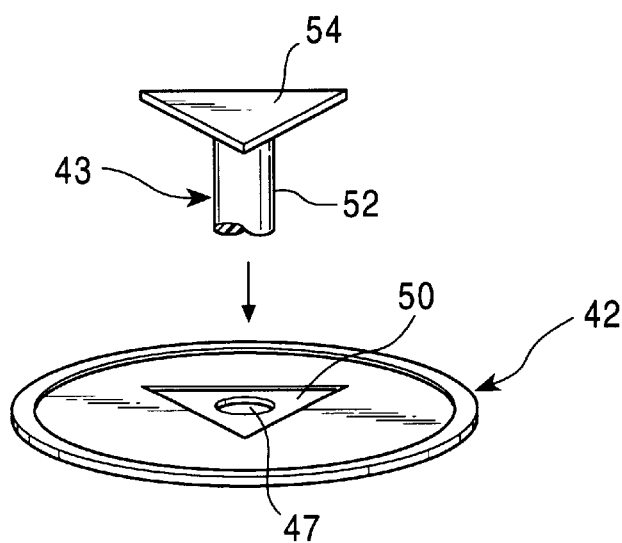
FIG. 8 is a perspective view of a fourth modification of the detent structure in the flange portion, in which the flange portion is formed in a triangular configuration.

As shown in FIG. 8, in the fourth modification, the flange receiving portion 50 provided at the center of the column insertion hole 47 on the back side of the case bottom plate member 42 has a triangular configuration, and the flange portion 54 of the stacking column 43 has also a triangular (non-circular) configuration.

In the case of the case bottom plate member 42 having the flange portion 50 having such a triangular configuration, positioning can be effected at the time of joining and the torsional force after the joining can be coped with, so that it is possible to prevent separation of the joint portion from being generated when the cap 46 (See FIG. 2) is attached or detached.

Next, a disc medium accommodating case according to the fourth embodiment of the present invention will be described with reference to FIGS. 9 through 14.

In the disc medium accommodating case of the fourth embodiment, the injection molding using dies and the configuration of the columnar portion 52 are changed such that the columnar portion 52 of the stacking column 43 can be smoothly inserted into the chucking hole 51 of the disc medium 41.

Figure 9A:
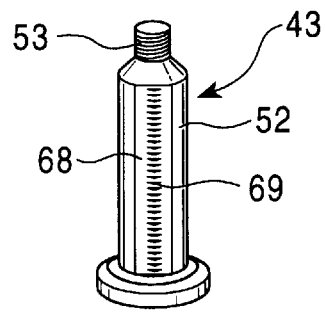
FIGS. 9(A) and 9(B) show the stacking column of a disc medium accommodating case according to a fourth embodiment of the present invention, in which the column portion of the stacking column is cut away to form planar sections, where protrusions generated in the seam of the dies are generated.
Figure 9B:
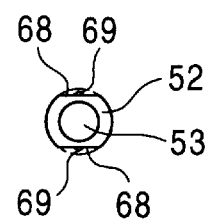
Figure 10:
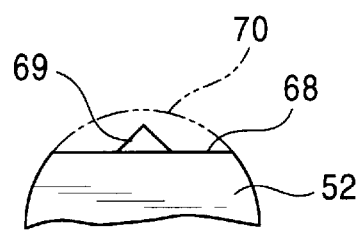
FIG. 10 is an essential-part sectional view showing the relationship between the protrusion and the column portion.

As shown in FIGS. 9 and 10, the columnar portion 52 of this stacking column 43 has flat surfaces 68 formed by cutting out two side portions in the longitudinal direction of the columnar portion, and protrusions 69 generated by the seam of the dies are formed on these flat surfaces 68. The flat surfaces 68 are formed such that the height of the protrusions 69 are within the range of the outer diameter 70 of the columnar portion 52.

Figure 11:
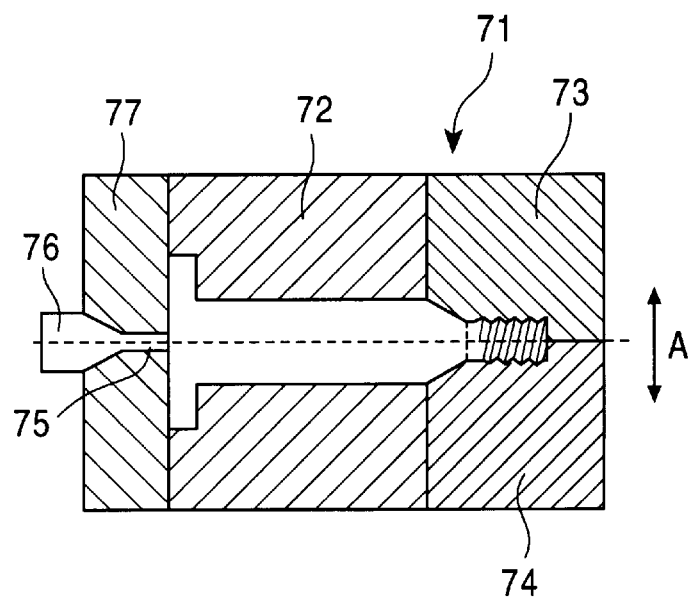
FIG. 11 is a diagram showing a conventional die for forming a stacking column through injection molding.

As shown in FIG. 11, a die 71 for preparing the conventional stacking column 43 by injection molding comprises a first core portion 72 which has a hollow for forming the flange portion and the columnar portion, second and third core portions 73 and 74 divided into two parts to form the male threaded-engagement portion, and a cavity portion 75 corresponding to the flange portion and equipped with a gate portion connected to a runner 75. In this die 71, constructed as described above, thermoplastic resin, for example, acryl-butylene-styrol (ABS), is first injected into the die. After the cooling of the injected resin, the second and the third core portions 73 and 74 are opened at the parting in the directions indicated by the arrows A. Next, the first core portion 72 and the cavity portion 77 are opened at the parting to extract the prepared stacking column 43.

This injection molding method is advantageous in that no burr or the like at the seam of the die is generated on the surface of the columnar portion 52 corresponding to the inner peripheral surface of the chucking hole 51 (See FIG. 1) of the disc medium 51. On the other hand, the die structure is complicated and the molding time is long. Further, a large extraction taper is required for the distance of extraction from the die.

Figure 12:
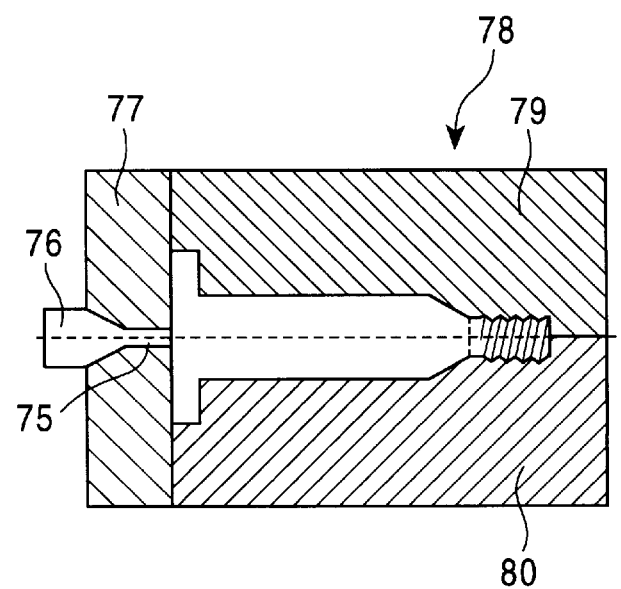
FIG. 12 is a diagram showing a die for forming the stacking column shown in FIGS. 9 and 10 through injection molding.

In view of this, as shown in FIG. 12, the die 78 used for the injection molding of this embodiment comprises first and second core portions 79 and 80 divided into two parts for preparing the entire stacking column, and a cavity portion 77. Due to this construction, after the injection of resin from the gate portion 76 of the cavity portion 77, the first and second core portions 79 and 80 are opened at the parting after cooling, so that the die structure is simplified and the molding time is shortened.

Figure 13:
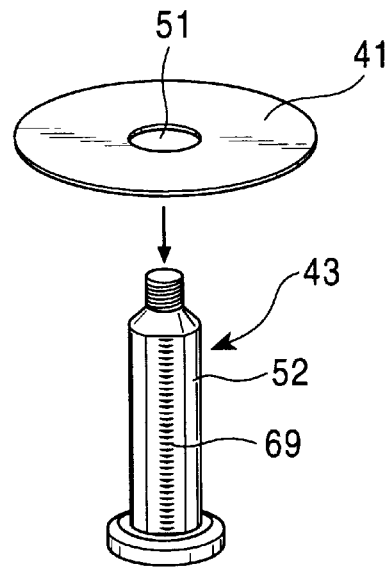
FIG. 13 illustrates the relationship between the stacking column formed by the die of FIG. 11 and a disc medium.

However, as shown in FIG. 13, even with this advantageous die 78, the stacking column 43 obtained exhibits on the surface of the columnar portion 52 linear protrusions 69 generated due the seam of the die. Thus, when this stacking column 43 is inserted into the chucking hole 51 of the disc medium 41, these protrusions 69 are rubbed against the inner peripheral surface of the chucking hole 51, and the protrusions 69 are worn into particles, which adhere to the recording surface of the disc medium 41 accommodated, which has an adverse effect on the recording and/or reproduction performed on the disc medium 41.

Figure 14:
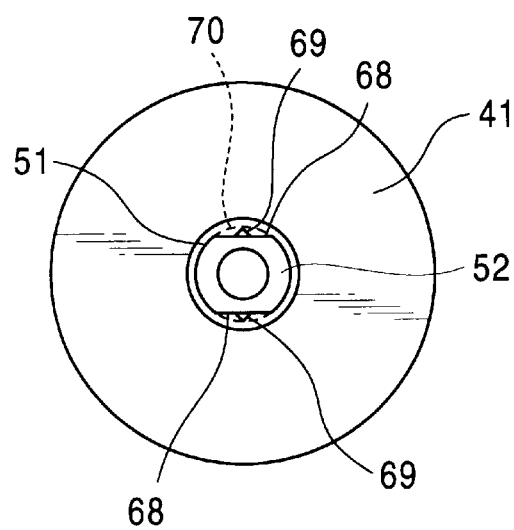
FIG. 14 is a plan view showing the engagement relationship between the column portion having cutout planes prepared by the die of FIG. 12 and a disc medium.

To eliminate such an adverse effect and to use the above-described simplified die 78 (See FIG. 12), the protrusions 69 generated at the seam of the die should not protrude beyond the outer diameter 70 of the columnar portion 52, as shown in FIG. 14 (See FIGS. 9 and 10). That is, the two sides of the stacking column 43 corresponding to the seam of the die are formed as cutout flat surfaces 68, and the protrusions 69 generated at the seam of the die and formed on these flat surfaces 68 do not protrude beyond the outer diameter 70 of columnar portion 52 (See FIG. 10). Due to this arrangement, no portion is rubbed against the inner peripheral surface of the chucking hole 51 when the stacking column 43 is inserted into the chucking hole, and the insertion can be effected smoothly, so that no particles due to rubbing are generated.

Next, a disc medium accommodating case according to the fifth embodiment of the present invention will be described with reference to FIGS. 15 and 16.

In the disc medium accommodating case of the fifth embodiment, the stacking column 43, the case bottom plate member 42 and the protective cover member 45 constituting the case are made entirely or partially antistatic.

Figure 15:
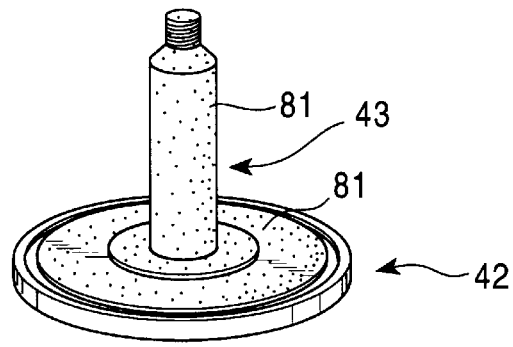
FIG. 15 illustrates how the case bottom plate member and the stacking column are made antistatic.
Figure 16:
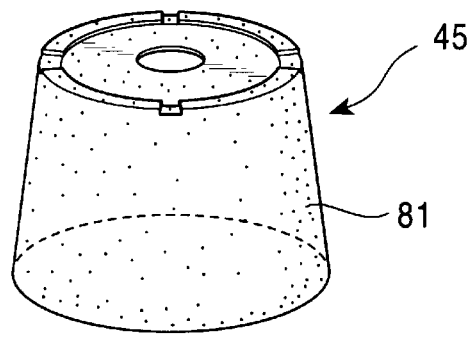
FIG. 16 illustrates how the protective cover member is made antistatic as in FIG. 15.
Figure 17:
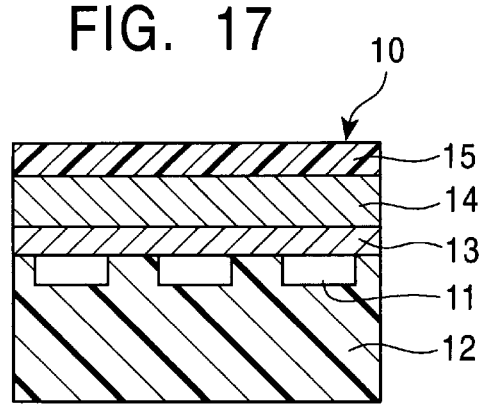
FIG. 17 is a sectional view showing the construction of a disc medium, in particular, an optical disc.
Figure 18:
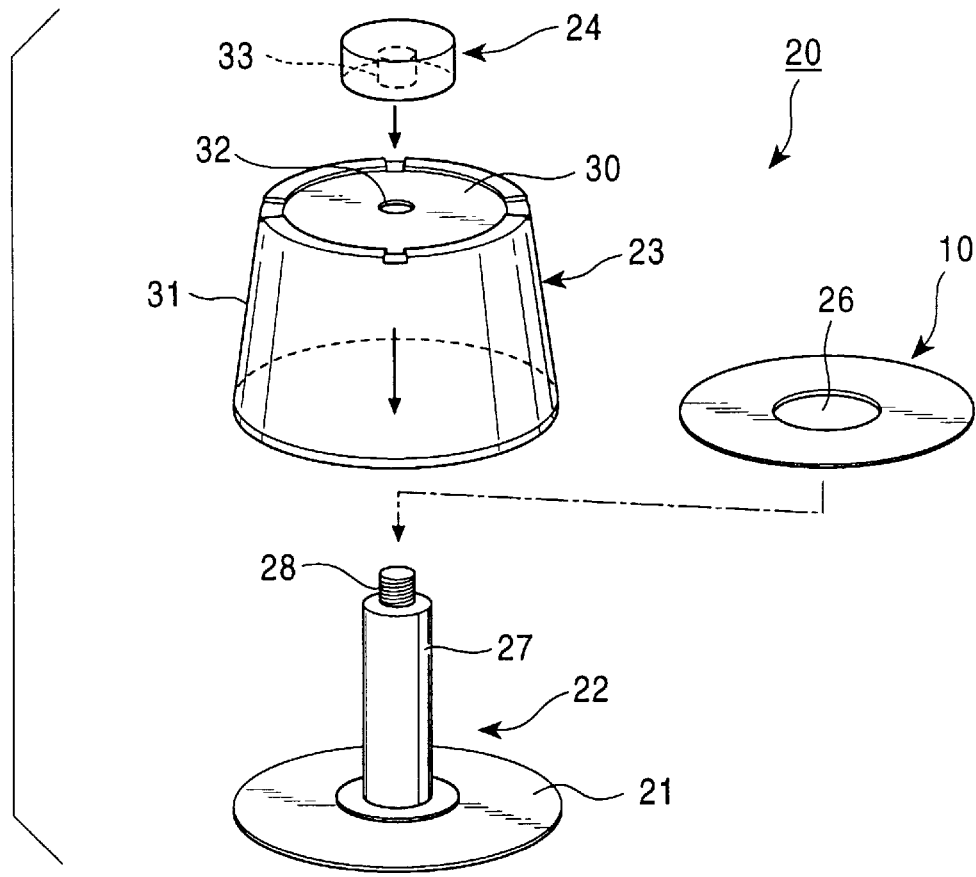
FIG. 18 is a general perspective view of a conventional disc medium accommodating case for transporting disc media.
Figure 19:
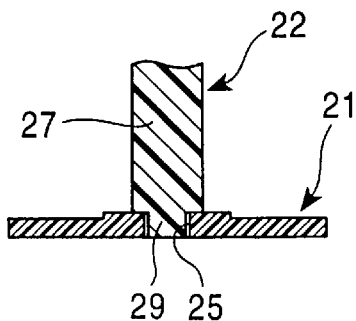
FIG. 19 is a sectional view showing the engagement relationship between the stacking column and the case bottom plate member in FIG. 18.

As shown in FIG. 15, the stacking column 43 and/or the case bottom plate member 42 is formed of a permanently antistatic resin made by mixing a resin with a hydrophilic polymer (for example, ABS Parel Resin (trade name) manufactured by Toray Industries, Inc.). By using the thus formed stacking column 43 and case bottom plate member 42, it is possible to restrain the generation of charge in service.

Apart from the filling of hydrophilic polymer, this antistatic resin 81 can be obtained by mixing a resin with a conductive filler such as surface active agent, carbon black, or stainless steel powder, and performing injection molding.

Alternatively, a similar antistatic effect can be obtained by diluting an anion-type, cation-type or nonionic-type surface active agent or an antistatic agent such as quaternary ammonium salt in a solvent such as ethanol and applying it by spraying and then drying.

Further, regarding the protective cover 45, it is formed by the vacuum molding, etc. of a sheet material and an antistatic effect can then be obtained by diluting an anion-type, cation-type or nonionic-type surface active agent or an antistatic agent such as quaternary ammonium salt in a solvent such as ethanol and applying it by spraying and then drying.

Further, an antistatic cover can be obtained adding 3% by weight of conductive powder such as tin oxide or antimony to a polyester type resin and applying the obtained mixture to the surface of the sheet before the formation of the protective cover member 45 by using a roll coater or the like, and then preparing the protective cover member 45 by vacuum molding or the like.

In this way, by using a resin containing an antistatic material or performing antistatic processing 81, it is possible to prevent dust from adhering to the disc medium due to the static electricity generated when transportation, etc. of a large number of disc media (optical discs in the embodiments) 41 is conducted.

As described above, in the disc medium accommodating case of the present invention, when joining the stacking column, which is inserted into the disc media to guide them, with the case bottom plate member, the stacking column is passed through the case bottom plate member and the flange portion of the stacking column is joined to the case bottom plate member, whereby it is possible to reinforce the stacking column and shorten the requisite time for producing the case.

Further, since the stacking column is reinforced, there is no need to separately perform reinforcement by an adhesive or the like, whereby it is possible to avoid an adverse effect of the out gas generated from the adhesive on the disc medium.

What is claimed is:

1. A disc medium accommodating case comprising:
 a disc case bottom plate member having a diameter that is larger than the outer diameter of the disc media,
 a stacking column that is embedded substantially at the center of the case bottom plate member in an erect position and which has a diameter that is smaller than the inner diameter of the chucking hole of the disc media,
 a protective cover member formed as a truncated case and adapted to be placed on the case bottom plate member, and
 a cap for fastening the protective cover member to the case bottom plate member through the intermediation of the stacking column,
 wherein a column insertion hole into which the stacking column can be inserted is provided at the center of the case bottom plate member, and a downwardly extending flange receiving portion is formed at the center of the back side of said case bottom plate member, wherein a flange portion having a detent means extends from the base end of the stacking column and an engagement portion to be engaged with the cap is provided at the forward end thereof, and wherein the stacking column is inserted into the column insertion hole from the back side of the case bottom plate member to join the flange portion with the flange receiving portion provided on the back side of the case bottom plate member.

2. A disc medium accommodating case according to claim 1, wherein the joining of the flange portion is effected by ultrasonic welding.

3. A disc medium accommodating case according to claim 1, wherein the detent means is provided by forming the column insertion hole and the flange portion of the stacking column in a non-circular configuration.

4. A disc medium accommodating case according to claim 1, wherein the stacking column has planes cut out on either side with respect to the longitudinal direction, and wherein protrusions generated by the seam of the die are formed on the planes.

5. A disc medium accommodating case according to claim 1, wherein the case bottom plate member, the stacking column, the protective cover member and the cap are entirely or partially made antistatic.

6. A disc medium accommodating case comprising:

a disc case bottom plate member having a diameter that is larger than the outer diameter of the disc media, a stacking column which is embedded substantially at the center of the case bottom plate member in an erect position and which has a diameter that is smaller than the inner diameter of the chucking hole of the disc media, a protective cover member formed as a truncated case and adapted to be placed on the case bottom plate member, and a cap for fastening the protective cover member to the case bottom plate member through the intermediation of the stacking column, wherein a column insertion hole into which the stacking column can be inserted is provided at the center of the case bottom plate member, and wherein a flange portion having a detent means is provided at the base end of the stacking column and an engagement portion to be engaged with the cap is provided at the forward edge thereof, and wherein the stacking column is inserted into the column insertion hole from the back side of the case bottom plate member to join the flange portion with the back side of the case bottom plate member; and wherein the stacking column has planes cut out on either side with respect to the longitudinal direction, and wherein protrusions generated by the seam of the die are formed on the planes.

* * * * *